United States Patent [19]

Becker

[11] Patent Number: 4,594,027

[45] Date of Patent: Jun. 10, 1986

[54] METHOD AND APPARATUS FOR PIPE POSITIONING

[76] Inventor: Manfred G. Becker, 12851 Durham, Warren, Mich. 48093

[21] Appl. No.: 488,896

[22] Filed: Apr. 27, 1983

[51] Int. Cl.[4] .............................................. F16L 1/02
[52] U.S. Cl. ................................... 405/154; 405/184; 414/747
[58] Field of Search .............. 405/134, 146, 154, 169, 405/170, 184; 414/745, 747, 910

[56] References Cited

U.S. PATENT DOCUMENTS

| | | | |
|---|---|---|---|
| 1,195,147 | 8/1916 | Mitchell | 414/747 |
| 2,807,937 | 10/1957 | Rhodes | 405/170 |
| 2,954,136 | 9/1960 | Butler et al. | 414/747 X |
| 3,233,315 | 2/1966 | Levake | 405/154 X |
| 3,958,704 | 5/1976 | Wire et al. | 414/747 X |
| 4,209,269 | 6/1980 | Martinez | 405/154 |

*Primary Examiner*—David H. Corbin
*Attorney, Agent, or Firm*—Remy J. VanOphem

[57] ABSTRACT

A method for aligning, relating to both line and grade, and interconnecting a first pipe with a second pipe as well as an apparatus utilizing the method. The method disclosed includes the steps of engaging the inner wall of the first pipe with a first pipe engaging means, engaging the inner wall of the second pipe with a second pipe engaging means, drawing the first end of the first pipe into engagement with the second end of the second pipe, engaging the ground adjacent the second end of the first pipe with ground engaging means, and adjusting the position of the pipe on the ground through manipulation of the ground engaging means.

28 Claims, 6 Drawing Figures

METHOD AND APPARATUS FOR PIPE POSITIONING

BACKGROUND OF THE PRESENT INVENTION

The present invention relates to a method and apparatus for positioning and drawing a pipe and more particularly to a method and apparatus for systematically positioning a large pipe, generally placed in a trench and subsequently covered with earth, and for pulling the pipe into engagement with another pipe already suitably located in the trench.

Underground pipelines are used for many purposes today. For example, underground pipes may be used for transmitting fluids such as fluid fossil fuel products, drinking water, sewage water, and miscellaneous waste products. Furthermore, underground pipes may be used for protecting buried electrical cables or fiber optic cables. Since these pipelines are numerous and increasing in number, and since existing pipelines require occasional replacement of pipe sections, an efficient and inexpensive method and apparatus for positioning pipes added to a pipeline is greatly needed.

Several different approaches have been tried in the past for setting and drawing pipes, and particularly pipes of large diameter. Many of these devices use external alignment and pipe positioning apparatus. For example, in U.S. Pat. No. 4,130,204 to Packard, a mobile land vehicle for laying successive pipe sections is disclosed. The device in Pickard includes a frame having a front and rear end and ground engaging support structure for the frame operative to support and advance the frame from and forwardly over the ground. The frame includes longitudinally spaced front and rear support structures supported therefrom and projecting outwardly from one side of the vehicle at points spaced therealong. The support structures each include pipe section engaging structures for engaging and supporting longitudinally spaced portions of a pipe section extending therebetween. The support structures each include structural components operative to adjustably position vertically and laterally the corresponding pipe section engaging structure relative to the frame of the vehicle.

Other examples of external apparatus for pulling and positioning pipes are found in U.S. Pat. Nos. 3,036,372 to Vigneron; U.S. Pat. No. 3,364,555 to Swink; U.S. Pat. No. 3,561,615 to Forsberg; U.S. Pat. No. 3,688,378 to Garvey; U.S. Pat. No. 3,710,427 to Doty; U.S. Pat. No. 3,840,968 to Mason; U.S. Pat. No. 4,039,087 to Sandvick, Sr.; U.S. Pat. No. 4,062,456 to Birdwell; U.S. Pat. No. 4,076,130 to Sumner; U.S. Pat. No. 4,218,158 to Tesson; and U.S. Pat. No. 4,253,779 to Grognu. The disadvantage of many of these devices is that they are often large and expensive. Many of them, including Pickard described above, often require two operators or an operator and an observer for proper operation. Furthermore, with many of these devices, at least a portion of the positioning must be done by another device, such as a backhoe machine. This increases the expense of using these devices, both in terms of equipment and in terms of manpower since the backhoe machine is not available for digging a trench while it is being used to lay and set pipes.

Alternatively, as shown in U.S. Pat. No. 4,107,317 to Bifani et al., a crane must be provided for initially positioning the pipe. This ties up extra personnel and requires additional, expensive equipment.

Still another solution which has been proposed for laying heavy pipe is shown in U.S. Pat. No. 3,958,704 to Wire et al. In Wire, a pipe carrying and laying attachment for heavy construction equipment, such as backhoes, excavation shovels and the like is provided. A support frame including a plurality of radially extending arms projecting therefrom, the terminal ends of the arms carrying support shoes, is adapted for fitting into the heavy pipe. Attachment permits the equipment to be used to lower the pipe for correct placement in a trench. Again, as described above, this method of laying pipe is inefficient since a rather large piece of equipment must be provided just for the purpose of positioning the pipe.

An alternate method for pulling pipe sections together has been described in the prior art involving a pulling device disposed within the pipes being joined. For example, U.S. Pat. No. 3,833,966 to Hubbard et al., teaches a method and machine for aligning and joining pipes wherein the machine is disposed within the pipe that is laid. Hubbard includes a mechanism that is extensible into the spigot end to be laid, the mechanism including rollers that are brought to abutting relationship with the shoulder at the spigot end of the pipe to be laid. The machine draws the spigot end of the pipe to be laid into sealing relationship with the bell of the pipe that was previously laid. Other examples of internally disposed pipe pulling apparatus may be found in U.S. Pat. Nos. 3,469,298, 3,486,214, 3,599,315, and 4,209,269. For each of these devices, the problem remains that the initial positioning of the pipe being added to the pipeline must be fairly accurate prior to the initiation of the pulling operation. Therefore, one of the above described positioning methods must still be used in conjunction with these pulling devices. Therefore, while these pulling devices more accurately position and interconnect the pipes of a pipeline, the need for the additional equipment continues to tie up both the additional equipment and the additional personnel during the pipe laying process.

Furthermore, once a pipe section is connected to an existing pipeline, dirt or aggregate material is backfilled into the trench around the newly added pipe. This operation can often result in movement of the newly added pipe relative to the pipeline, partially undoing the work done by the above described positioning and pulling devices. None of the prior art devices provides a way to prevent motion of the pipe during the backfilling operation.

What is needed, therefore, is an apparatus which may be used to accurately position a pipe added to a pipeline relative to the existing pipeline and to draw the new pipe into interconnection with the existing pipeline inexpensively and efficiently. Furthermore, what is needed is an apparatus which will secure the newly added pipeline in position during a backfilling operation.

SUMMARY OF THE PRESENT INVENTION

The present invention provides a method and apparatus for positioning a pipe added to an existing pipeline relative to the existing pipeline and for drawing the added pipe into interconnection with the existing pipeline. The present invention further provides a method and apparatus for securing the newly added pipe in position during a backfilling operation.

The method of the present invention includes the steps of engaging the added pipe by a first pipe engaging device and engaging the inner wall of the existing pipe in the pipeline to which the first pipe is to be connected with a second pipe engaging device. The first pipe engaging device is drawn towards the second pipe engaging device to bring the ends of the two pipes into alignment and, eventually, into engagement. The ground adjacent to the end of the added pipe opposite the end which is to be engaged with the existing pipe is engaged by a ground engaging device which is, in turn, interconnected with the first pipe engaging device. The ground engaging device provides for adjustment of the added pipe relative to the existing pipe to provide for a better interconnection between the two pipes and further provides for a temporary, secure positioning of the added pipe during a backfilling operation.

The apparatus of the present invention includes a first and second pipe engaging device each engageable with the inner wall of the two pipes to be joined. The two pipe engaging devices are connected together by an interconnection device which permits selectively drawing the two pipe engaging devices together. Furthermore, a ground engaging device is movably interconnected with the pipe engaging device disposed within the added pipe so as to permit adjustment of the position of the added pipe to properly align the two pipes. The ground engaging device further permits the pipe to be secured in position during an operation for providing a permanent support for the pipe, such as a backfilling operation.

In the preferred embodiment, each of the pipe engaging devices has a platform engaging a lower portion of one of the pipes, a pressure plate selectively engageable with an upper portion of one of the pipes, and a piston and cylinder assembly interposed the platform and the pressure plate and selectively operable by a pump to drive the pressure plate against the upper portion of the inner wall of the pipe to interconnect the pipe engaging device with the pipe. Furthermore, the pipe engaging device in the existing pipe is preferably mounted at an angle so as to better engage the existing pipe during the drawing operation.

Also in the preferred embodiment, the ground engaging device includes a platform engageable with the ground and two piston and cylinder assemblies each interposed the ground engaging platform and the pressure plate of the associated pipe engaging device. The same pump used to selectively operate the pipe engaging devices may be used to selectively and independently operate the two piston and cylinder assemblies associated with the ground engaging device so as to selectively engage the ground engaging device with the ground and to selectively adjust the position of the free end of the added pipe.

The preferred embodiment further uses a piston and cylinder assembly selectively operable through the pump referred to above to selectively draw the pipe engaging devices together.

A principal object of the present invention is to provide an inexpensive and easily operable pipe positioning device for positioning a first pipe relative to a second pipe.

A further object of the present invention is to provide a pipe drawing device which positions two pipes relative to each other as well as drawing the pipes into engagement with each other.

Still another object of the present invention is to provide a pipe positioning apparatus which may be operated by a single operator to position and interconnect an added pipe to an existing pipeline.

Another object of the present invention is to provide a pipe setting apparatus which positions a pipe in a trench and secures the pipe in the desired position during a backfilling operation or similar supporting operation.

A still further object of the present invention is to provide an inexpensive pipe drawing and positioning apparatus which may be disposed entirely within and operated from within a pipeline.

Still yet another object of the present invention is to provide a pipe drawing and positioning apparatus using a single drive power source to position the pipe, to draw the pipe into connection with an existing pipeline, and to secure the pipe in position during a backfilling operation or similar supporting operation.

These and the many other objects, features, and advantages of the present invention will become apparent to those skilled in the art when the following detailed description of the preferred embodiment is read in conjunction with the drawings appended hereto. In the drawings, like reference numerals refer to like components throughout.

DETAILED DESCRIPTION OF THE PREFERRED EMBODIMENT

Figure 1:
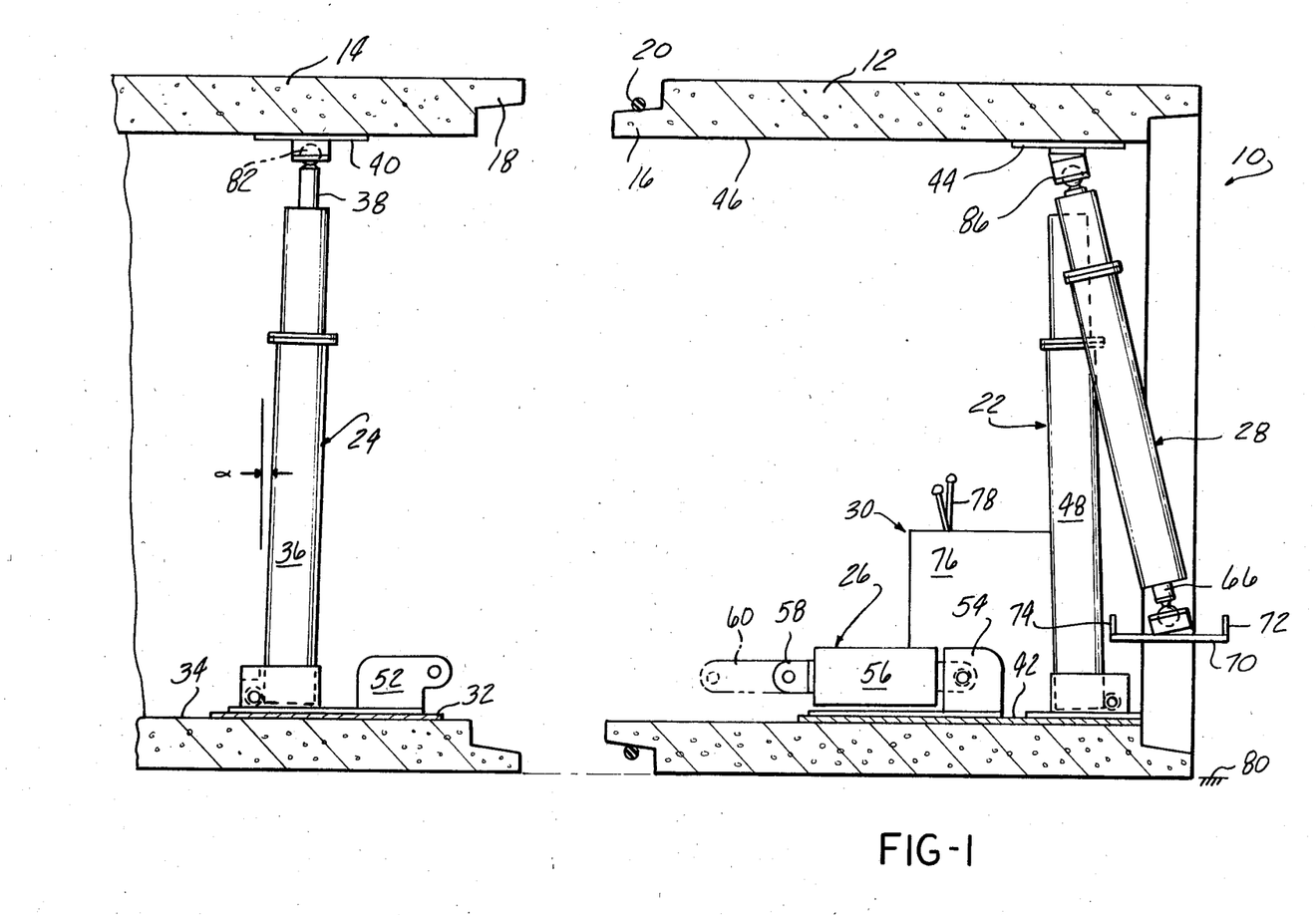
FIG. 1 is a schematic sectional view through a pipe illustrating a side view of an example of a pipe positioning and drawing apparatus according to the present invention.

FIG. 1 illustrates, somewhat schematically, an example of structure of an apparatus 10 according to the present invention for drawing a first pipe 12 into engagement with a second pipe 14, positioning the first pipe 12 relative to the second pipe 14 to provide a better seal therebetween, and for temporarily securing the first pipe 12 in position during a backfilling operation. The second pipe 14 is the last pipe of an existing buried pipeline and the first pipe 12 is a new pipe being added to the pipeline. As shown in the drawing, the first pipe 12 has a spigot 16 engageable with the bell 18 of the second pipe 14. A seal member 20 may be disposed on the spigot 16 to improve the seal obtained between the spigot and the bell.

The following description of the preferred embodiment is given in terms of circular pipes 12 and 14. It will be apparent, however, to one skilled in the art that the device of the present invention may be readily adapted for use for interconnecting pipes having noncircular cross-sections, such as, for example, pipes having oval cross-sections or polygonal cross-sections. Furthermore, while the following description is written in terms of the specific structure depicted in the drawings, it will be appreciated by one skilled in the art that variations and modifications may be made from the structure disclosed and described herein. Such modifications are within the spirit of the present invention and within the intended scope of the claims appended hereto.

The apparatus 10 of the present invention, as shown in FIGS. 1 through 6, is a first pipe engaging device 22 disposed within the first pipe 12 and a second pipe engaging device 24 disposed within the second pipe 14. The apparatus 10 of the present invention also includes an interconnection 26 between the first pipe engaging device 22 and the second pipe engaging device 24 and a ground engaging device 28 connected with the first pipe engaging device 22. Finally, the apparatus 10 includes a control apparatus 30. Each of these components will be described in detail below.

The second pipe engaging device 24 is essentially a deadman used to engage the second pipe 14 so that the first pipe 12 may be drawn thereto. The second pipe engaging device 24 consists of a pressure pad or platform 32 resting on the lower portion of the inner wall 34 of the second pipe 14. The platform 32 may be curved to fit the shape of the inner wall 34. If desired, the platform 32 may be provided with wheels, not illustrated in the drawings, to facilitate movement of the platform 32 along the inner wall 34 of the pipe when desired. The second pipe engaging device 24 further includes a cylinder 36 mounted to the platform 32 and extending upwardly therefrom. A piston member 38 is reciprocably mounted in the cylinder 36 in a known manner and extends upwardly therefrom. A pressure plate 40 is pivotally mounted to the upper end of the piston member 38 and is selectively engageable with the upper portion of the inner wall 34 of the second pipe 14. As illustrated in the drawings, the piston member 38 may be selectively reciprocated within the cylinder 36 to bias the pressure plate 40 against the upper portion of the inner wall 34 of the second pipe 14 to secure the second pipe engaging device 24 in position in the second pipe 14. As shown in FIG. 1 the cylinder 36 is preferably mounted to the platform 32 at a slight angle $\alpha$ such that the cylinder leans in the direction towards the first pipe 12. It will become apparent to one skilled in the art that the angular positioning of the cylinder 36 provides a more secure interconnection between the second pipe engaging device 24 and the second pipe 14 during a drawing operation than a strictly horizontal positioning would provide.

The first pipe engaging device 22 is similar in structure to the second pipe engaging device 24 in that the first pipe engaging device 22 includes a platform 42 and a pressure plate 44 engaging the inner wall 46 of the first pipe 12. Furthermore, the first pipe engaging device 22 includes a cylinder 48 mounted to the platform 42 and extending upwardly therefrom and a piston 50, not shown in FIG. 1 but illustrated in FIG. 2, reciprocably mounted in the cylinder 48 and extending upwardly therefrom to provide a pivotal connection with the pressure plate 44. The cylinder 48 is preferably mounted at a slight angle relative to the platform 42 such as to lean towards the second pipe 14 for the reasons described above relative to the cylinder 36.

The interconnection 26 between the first pipe engaging device 22 and the second pipe engaging device 24 includes a mounting bracket 52 extending upwardly from the platform 32 and a similar mounting bracket 54 extending upwardly from the platform 42. A cylinder 56 is pivotally mounted to the mounting bracket 54 and extends therefrom towards the mounting bracket 52. A piston member 58 is reciprocably mounted in the cylinder 56 and extends therefrom towards the mounting bracket 52. A link member 60 interconnects the free end of the piston member 58 with the mounting bracket 52.

Figure 2:
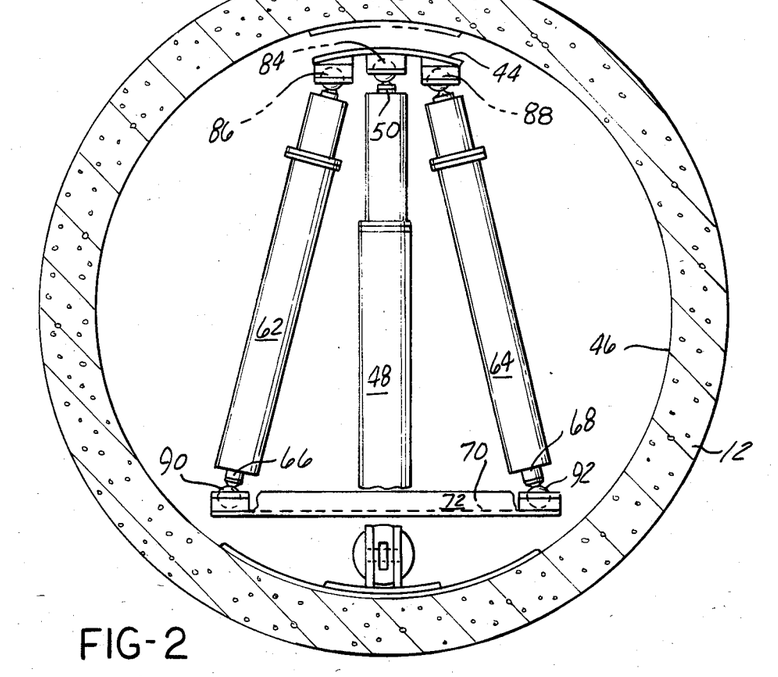
FIG. 2 is a front view thereof showing one of the pipe engaging devices as well as the ground engaging device associated therewith.

The structure of the ground engaging device 28 is shown in FIGS. 1 and 2 of the drawings. The ground engaging device 28 includes two cylinders 62 and 64 each swingably mounted to the pressure plate 44 of the first pipe engaging device 22 and extending downwardly therefrom and angularly away from each other. Piston members 66 and 68 extend, respectively, downwardly from the cylinders 62 and 64 and are each swingably mounted to a ground engaging platform 70. The ground engaging platform 70 consists of a substantially flat rigid member having upturned edges 72 and 74 to provide rigidity to the platform.

The control apparatus 30 is generally contained within a housing 76 mounted to the platform 42. The individual components of the control apparatus 30 are not shown since the components are each well known in the art and their assembly will be readily appreciated by one skilled in the art. The control apparatus 30 includes a pump operated by a suitable power supplying device to provide a source of pressurized fluid. Individual fluid lines interconnect the pump with each of the cylinders 36, 48, 56, 62, and 64. Switches, such as levers 78 are provided to selectively open and close valves along lines supplying each of the cylinders so as to pressurize the respective cylinders and advance the piston members 38, 50, 58, 66, and 68 to perform the various functions of the apparatus 10.

For operation, therefore, the control apparatus 30 is operated to supply pressurized fluid to the cylinder 36 so as to engage the second pipe engaging device 24 with the second pipe 14. The control apparatus 30 is also actuated so as to supply pressurized fluid to the cylinder 48 so as to advance the piston 50 upwardly and thereby engage the first pipe engaging device 22 with the first pipe 12. Next, the control apparatus 30 is operated to withdraw pressurized fluid from the cylinder 56 so as to draw the first pipe engaging device 22 towards the second pipe engaging device 24 and, therefore, to draw the first pipe 12 towards the second pipe 14. The two pipes are drawn together until the spigot 16 of the first pipe 12 encounters the bell 18 of the second pipe 14 and the relative motion is arrested. The control apparatus 30 is then operated to supply pressurized fluid to the cylinders 62 and 64 so as to lower the ground engaging platform 70 into engagement with the ground 80 adjacent to the free end of the first pipe 12. The pressurized fluid supplied to the cylinders 62 and 64 may be independently varied so as to raise the free end of the first pipe 12 and to better align the spigot and bell of the respective pipes. Furthermore, the cylinders 62 and 64 may be independently operated to pivot the first pipe 12 to further position the pipe. Subsequently, the pressure to the cylinders 62 and 64 may be reduced by operation of the control apparatus 30 so as to lower the free end of the first pipe 12 onto the ground 80 in a desired position and to secure the pipe against rotation from the desired position. The ground engaging device 28 may be maintained in this position while soil or aggregate material is filled in around the first pipe 12. Thus, the soil or aggregate material will not cause the pipe to rotate away from its desired position as occurs with prior art devices.

It may be appreciated, further, that the ground engaging device may be used to maintain the free end of the first pipe 12 in a raised position when desired during a backfilling operation to maintain the pipe at the grade level since the trenches are generally dug unevenly due to the type of excavation equipment used. Furthermore, it may readily be appreciated that the second pipe engaging device 24 may be, if desired, disconnected from the first pipe engaging device 22 and the apparatus consisting of the first pipe engaging device 22, the ground engaging device 28 and the control apparatus 30 may be used without the second pipe engaging device as a positioning and securing device.

It should be noted that any of the pivotal connections provided in the above described structure are preferably ball and socket connections so as to provide a good engagement of the inner walls 46 and 34, respectively, of the first pipe 12 and second pipe 14 as well as with the ground 80. The ball and socket connections assist the device in compensating for irregularities in the walls and on the surface of the ground. Therefore, in the preferred embodiment, ball and socket connections 82 and 84 are provided, respectively, between the piston members 38 and 50 and the pressure plates 40 and 44. Ball and socket connections 86 and 88 are provided, respectively, between the cylinders 62 and 64 and the pressure plate 44. Finally, ball and socket connections 90 and 92 are provided between the piston members 66 and 68, respectively, and the ground engaging platform 70.

Figures 3, 4, 5:
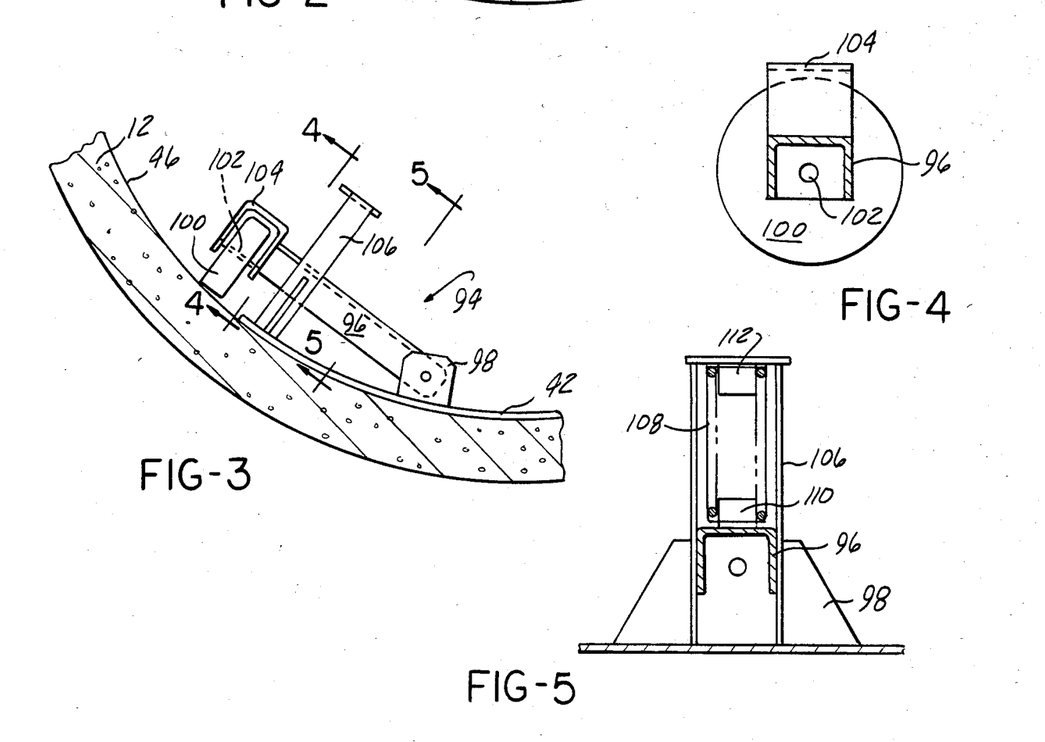
FIG. 3 is an enlarged partial view thereof depicting an example of a wheel structure for the platform of the pipe engaging device of FIG. 2.
FIGS. 4 and 5 are sectional views through FIG. 3 taken, respectively, along lines 4—4 and 5—5 thereof.

FIGS. 3, 4, and 5 depict an example of structure for a wheel assembly 94 for the platform 42. The wheel assembly 94 consists of an arm 96 pivotally mounted to a mounting bracket 98 extending upwardly from the platform 42. A wheel 100 is mounted to an axle 102 which in turn is mounted to the free end of the mounting bracket 98 within a U-shaped wheel housing 104. A spring housing 106 extends upwardly from the platform 42 and surrounds a midportion of the arm 96. A spring 108 is mounted between a keeper 110 on the arm 96 and a keeper 112 in the spring housing 106, as shown in FIG. 5, to bias the wheel 100 outwardly towards the inner wall 46 of the first pipe 12.

The similar wheel assemblies 94 are preferably provided, two on each side of the platform 42. Thus, when the first pipe engaging device 22 is actuated to engage the first pipe 12, the pressure within the cylinder 48 causes the spring 108 to be compressed and the platform 42 is biased to rest against the inner wall 46 of the first pipe 12. When the pressurized fluid in the cylinder 48 is vented, however, so that the pressure plate 44 moves away from the upper portion of the inner wall 46 of the first pipe 12, the spring 108 acts to bias the platform 42 upwardly away from the inner wall 46 and, therefore, permits the assembly resting on the platform 42 to be freely moved on the wheels 100 along the pipe.

Figure 6:
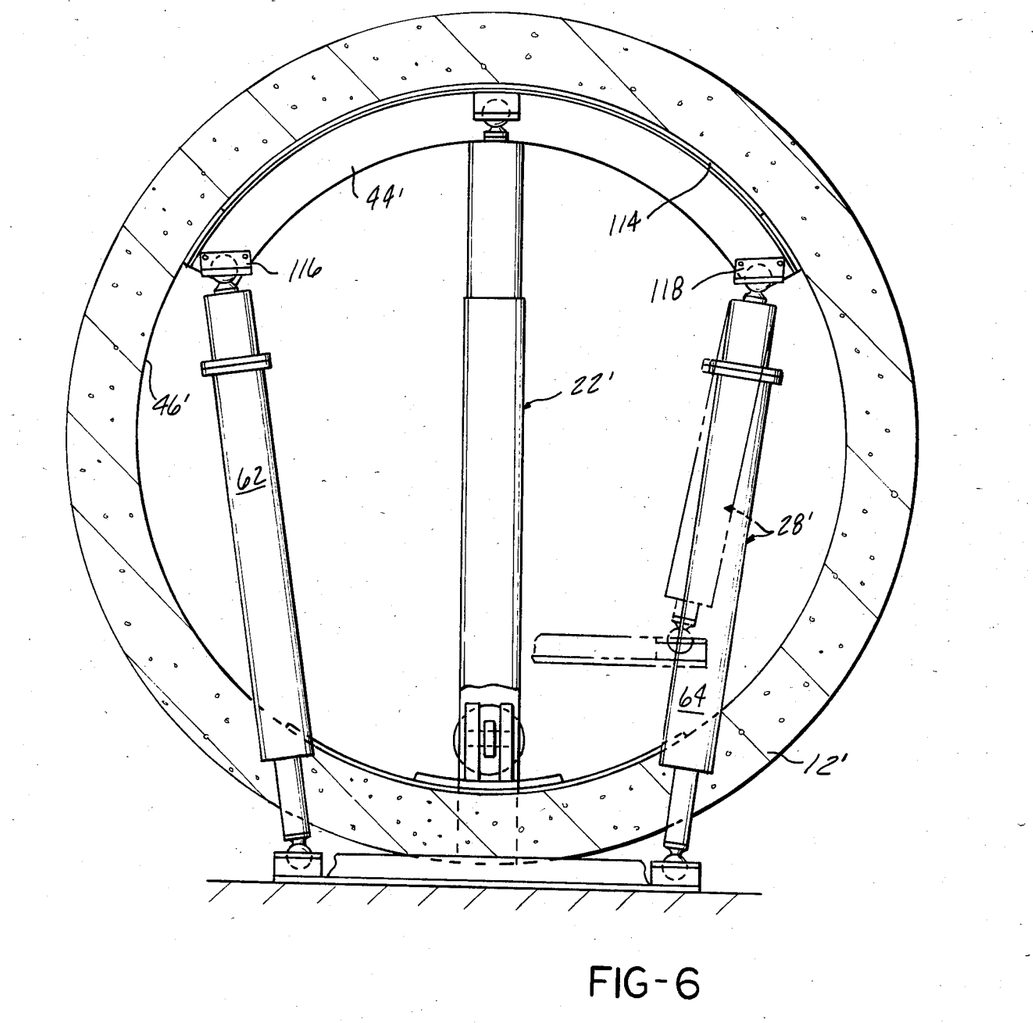
FIG. 6 is a view similar to FIG. 2 but illustrating an alternate example of the structure for the pipe engaging device and the ground engaging device thereof.

FIG. 6 illustrates an alternate structure for a first pipe engaging device 22' and a ground engaging device 28'. The alternate structure illustrated in FIG. 6 is designed for use in positioning pipes having inner liners 114 disposed around the upper portion of the inner surface 46' of the pipe 12'. In order to protect the liner 114, the pressure plate 44' extends along a substantial portion, or all of the liner 114 to distribute the pressure exerted on the liner during the engagement of the pressure plate. For this purpose, the cylinders 62 and 64 are mounted to the extreme ends 116 and 118 of the pressure plate 44'. The apparatus of the present invention is especially suitable for use with this type of pipe since the apparatus permits rotation of the pipe to position the liner at the top of the pipe.

It may be appreciated that the apparatus of the present invention offers significant advantages when used for positioning pipe having a polygonal or oval cross-section since the apparatus permits the positioning of the pipe, both line and grade, as well as rotation of the pipe into alignment.

It will appreciated by one skilled in the art that the present invention provides an inexpensive and convenient method and apparatus for drawing and positioning a pipe added to an existing pipeline or for interconnecting any two pipes and further for securing a pipe in position during a backfilling operation. The apparatus may be operated by one individual who, in the case of a large diameter pipe, may operate the apparatus of the present invention from inside of the pipe. It may be appreciated, however, that the present invention may be varied to provide a method and apparatus for interconnecting pipes having smaller diameters or for pipes disposed in locations not easily accessible by an operator, such as, for example, pipes which are laid underwater. Clearly, such devices are within the scope of the present invention.

The above detailed description constitutes the best mode contemplated by the inventor at the time of filing for carrying out the present invention, and is offered by way of example and not by way of limitation.

What is claimed as novel is as follows:

1. An apparatus for positioning a first pipe resting horizontally on the ground and having a first end and a second end and an inner surface relative to a second pipe also resting horizontally on the ground and having an end and an inner surface, said apparatus being for the interconnection of said first end of said first pipe with said end of said second pipe, said apparatus comprising:
   first pipe engaging means disposed in said second end of said first pipe and selectively engageable with the inner surface of said first pipe;
   second pipe engaging means independently mounted from said first pipe engaging means, said second pipe engaging means further being disposed in said end of said second pipe and selectively engageable with the inner surface of said second pipe;
   interconnection means mechanically interposed said first pipe engaging means and said second pipe engaging means;
   first drive means cooperating with said interconnection means and selectively operable to draw said second pipe engaging means towards said first pipe engaging means, such as to draw said first end of said first pipe into engagement with said end of said second pipe; and
   ground engaging means interconnected with said first pipe engaging means and extending from said second end of said first pipe, said ground engaging means further being selectively operable to engage the ground adjacent said second end of said first pipe such as to selectively move said second end of said first pipe relative to the ground.

2. The apparatus of claim 1 wherein said ground engaging means comprises:
   a platform member selectively engageable with the ground adjacent said first pipe;

reciprocation means having one end pivotally attached to said platform member and an opposite end pivotally attached to said first pipe engaging means; and drive means mounted to said first pipe engaging means, said drive means being selectively operable to move said platform member into engagement with the ground such that said drive means is independently operable to adjust the position of said second end of said first pipe with respect to the ground to more effectively align said first pipe with said second pipe.

3. The apparatus of claim 1 wherein each of said first and second pipe engaging means comprises:

platform means resting on a first portion of said inner surface of said first and second pipe interposed said inner surface and said first pipe an second pipe engaging means;

pressure plate means interposed said first pipe and second pipe engaging means and said inner surface of said first and second pipe, said pressure plate means being selectively engageable with a second portion of said inner surface of said first and second pipe;

expansion cylinder means having one end attached to said platform means, an opposite end attached to said pressure plate means, and a central axis; and second drive means mounted to said platform means of said first pipe engaging means, said second drive means being selectively operable to drive said expansion cylinder means to selectively move said pressure plate means of said first pipe and second pipe engaging means into engagement with said second portion of said inner surface of said first and second pipe, respectively.

4. The apparatus of claim 3 wherein said expansion cylinder means comprises piston means and cylinder means and wherein further said second drive means comprises pump means.

5. The apparatus of claim 3 wherein said first pipe and second pipe engaging means further comprises a plurality of wheels interposed said platform means and said inner wall facilitating movement of said first pipe and second pipe engaging means along said first and second pipe associated with said first pipe and second pipe engaging means, respectively.

6. The apparatus of claim 3 wherein said expansion cylinder means is disposed at a predetermined angle relative to said first and second pipe such that said central axes at said opposite ends of said first pipe and second pipe engaging means are closer together than said central axes of said one end attached to said platform means of said first pipe and second pipe engaging means such as to provide more reliable engagement of said first pipe engaging means with said first pipe when said first drive means is operated to draw said first and second pipes together.

7. The apparatus of claim 1 wherein said interconnection means comprises a piston means and a cylinder means and further wherein said first drive means comprises pump means.

8. The apparatus of claim 4 wherein said ground engaging means comprises:

a platform member selectively engageable with the ground;

reciprocation means having one end attached to said platform member and an opposite end attached to said first pipe engaging means; and drive means mounted to said first pipe engaging means, said drive means being selectively operable to move said platform member into engagement with the ground such that said drive means may be independently operated to adjust the position of said second end of said first pipe with respect to the ground to more effectively align said first pipe with said second pipe.

9. The apparatus of claim 2 wherein said reciprocation means comprises a piston means and a cylinder means, and wherein further said drive means comprises pump means.

10. The apparatus of claim 8 wherein said second pipe engaging means comprises:

platform means resting on a lower portion of the inner wall of said pipe associated with said at least one of said first and second pipe engaging means;

pressure plate means selectively engageable with an upper portion of said inner wall;

second reciprocation means interposed said platform means and said pressure plate means; and second drive means selectively operable to drive said second reciprocation means to cause said pressure plate means to engage said upper portion of said inner wall.

11. The apparatus of claim 10 wherein said expansion cylinder means is disposed at a predetermined angle relative to said first and second pipe such that said central axes at said opposite ends of said first pipe and second pipe engaging means are closer together than said central axes of said one end attached to said platform means of said first pipe and second pipe engaging means such as to provide more reliable engagement of said first pipe engaging means with said first pipe when said first drive means is operated to draw said first and second pipes together.

12. The apparatus of claim 11 wherein said first pipe and second pipe engaging means further comprises a plurality of wheels interposed said platform means and said inner wall facilitating movement of each of said first and second pipe engaging means, respectively.

13. The apparatus of claim 5 wherein said expansion cylinder means is disposed at a predetermined angle relative to said first and second pipe such that said central axes at said opposite ends of said first pipe and second pipe engaging means are closer together than said central axes of said one end attached to said platform means of said first pipe and second pipe engaging means such as to provide more reliable engagement of said first pipe engaging means with said first pipe when said first drive means is operated to draw said first and second pipes together.

14. The apparatus of claim 13 wherein said first pipe and second pipe engaging means further comprises a plurality of wheels interposed said platform means and said inner wall facilitating movement of said first pipe and second pipe engaging means along said first and second pipe associated with said first pipe and second pipe engagement means, respectively.

15. An apparatus for positioning a first pipe with respect to an adjacent second pipe resting on the ground, said apparatus comprising:

pipe engaging means completely contained within said first pipe and selectively engageable with an inner wall of said first pipe; and ground engaging means having one end pivotally attached to said pipe engaging means completely contained within said first pipe and another opposite end selectively engageable with the ground adjacent said first pipe, and ground engaging means being selectively operable to adjust the position of said first pipe relative to the ground, said ground engaging means comprising:
a platform member selectively engageable with the ground adjacent said first pipe;
reciprocation means having one end pivotally attached to said platform member and an opposite end pivotally attached to said pipe engaging means; and
first drive means mounted to said pipe engaging means, said first drive means being selectively operable to move said platform member into engagement with the ground adjacent said first pipe, said first drive means operable to independently move said reciprocation means to adjust the position of said first pipe.

16. The apparatus of claim 15 wherein said pipe engaging means comprises:
platform means resting on a first portion of said inner wall of said first pipe;
pressure plate means disposed opposite said platform means, said pressure plate means being selectively engageable with a second portion of said inner wall of said first pipe;
expansion cylinder means having one end attached to said platform means, an opposite end attached to said pressure plate means, and a central axis; and
second drive means mounted to said platform means, said second drive means being selectively operable to move said expansion cylinder means to move said pressure plate means into engagement with said second portion of said inner wall of said first pipe.

17. The apparatus of claim 16 wherein said expansion cylinder means comprises piston means and cylinder means and further wherein said drive means comprises pump means.

18. The apparatus of claim 16 wherein said pipe engaging means further comprises a plurality of wheels interposed said platform means and said inner wall facilitating movement of said pipe engaging means along said pipe associated with said pipe engaging means.

19. The apparatus of claim 16 wherein said expansion cylinder means is disposed at a predetermined angle relative to said first pipe to provide more reliable engagement of said first pipe engaging means with said first pipe.

20. The apparatus of claim 16 wherein said pipe engaging means further comprises:
a first pipe engagement member having one end and an opposite end, said first pipe engagement member being mounted in and completely contained within said first pipe; and
a second pipe engagement member having one end and an opposite end, said second pipe engagement member being mounted in and completely contained within said second pipe.

21. The apparatus of claim 20 wherein said expansion cylinder means comprises piston means and cylinder means and further wherein said drive means comprises pump means.

22. The apparatus of claim 21 wherein said pipe engaging means further comprises a plurality of wheels interposed said platform means and said inner wall facilitating movement of said pipe engaging means along said pipe associated with said pipe engaging means.

23. The apparatus of claim 20 further comprising:
interconnection means mechanically interposed said first pipe engagement member and said second pipe engagement member, said interconnection means selectively operable to draw said first pipe engagement member towards said second pipe engagement member, such as to draw said first pipe into engagement with said second pipe.

24. The apparatus of claim 23 wherein said platform means further comprises:
a first pipe platform member mounted on said one end of said first pipe engagement member, said first pipe platform member interposed said first portion of said inner wall of said first pipe and said first pipe engagement member; and
a second pipe platform member mounted on said one end of said second pipe engagement member interposed said first portion of said inner wall of said second pipe and said second pipe engagement member.

25. The apparatus of claim 24 wherein said pressure plate means further comprises:
a first pressure plate member mounted on said opposite end of said first pipe engagement member, said first pressure plate member interposed said second portion of said inner wall of said first pipe and said first pipe engagement member; and
a second pressure plate member mounted on said opposite end of said second pipe engagement member, said second pressure plate member interposed said second portion of said inner wall of said second pipe.

26. The apparatus of claim 25 wherein said expansion cylinder means further comprises:
a first cylinder and piston assembly interposed said first pipe platform member and said first pressure plate member, said first cylinder and piston assembly operable to selectively move said first pressure plate member into engagement with said second portion of said inner wall of said first pipe, said first cylinder and piston assembly disposed at a first predetermined angle relative to said first pipe; and
a second cylinder and piston assembly interposed said second pipe platform member and said second pressure plate member, said second cylinder and piston assembly operable to selectively move said second pressure plate member into engagement with said second portion of said inner wall of said second pipe, said second cylinder and piston assembly disposed at a second predetermined angle relative to said second pipe whereby said central axes of said first pipe and second pipe engaging means are closer together at said first and second pressure plate members than said central axes at said first and second pipe platform members, such as to provide more reliable engagement of said first pipe engaging means with said first pipe when said interconnection means is operated to draw said first pipe into engagement with said second pipe.

27. A method of interconnecting a first pipe resting horizontally on the ground and having a first end and a second end with a second pipe also resting horizontally on the ground and having an end, and an inner surface, said method comprising the steps of:
engaging said inner surface of said first pipe with a first pipe engaging means completely contained within said first pipe;

engaging said inner surface of said second pipe with a second pipe engaging means completely contained within said second pipe;

interconnecting said first pipe and second pipe engaging means with an interconnecting member;

drawing said first end of said first pipe into a first predetermined alignment with said end of said second pipe;

engaging the ground adjacent said second end of said first pipe with a ground engaging means having a reciprocation means;

positioning said second end of said first pipe with respect to said end of said second pipe through selective operation of said reciprocation means; and drawing said first end of said first pipe into final engagement with said end of said second pipe.

28. The method of claim 27 wherein said first pipe and said second pipe are each disposed in a trench, said method further comprising the step of supporting said first pipe with said ground engaging means during backfilling of said trench.

* * * * *